June 16, 1953     H. A. MYERS     2,641,800
APPARATUS FOR ADVANCING AND WORKING PLASTIC COMPOUNDS
Filed June 21, 1951     2 Sheets-Sheet 1
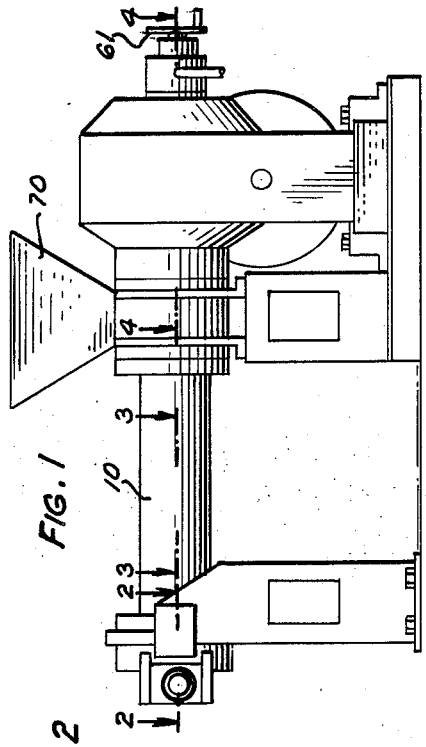
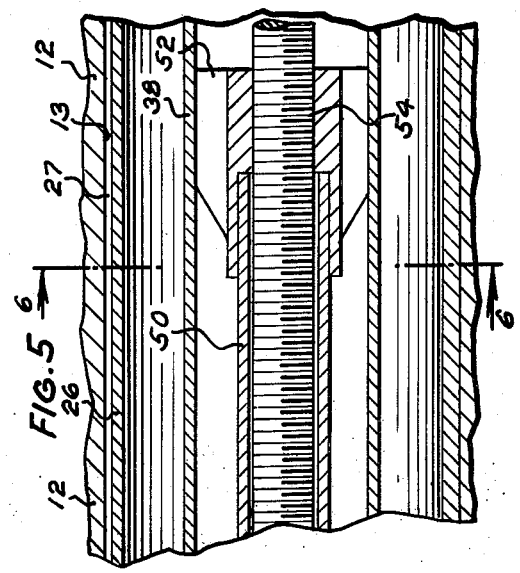
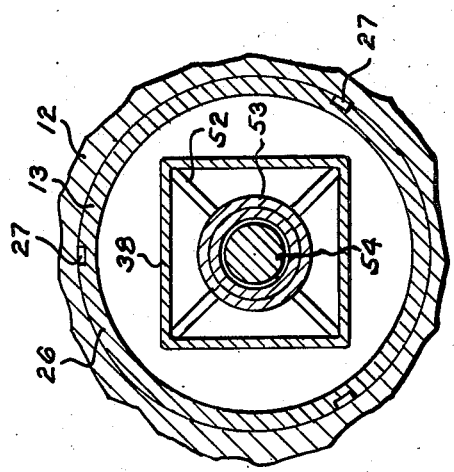
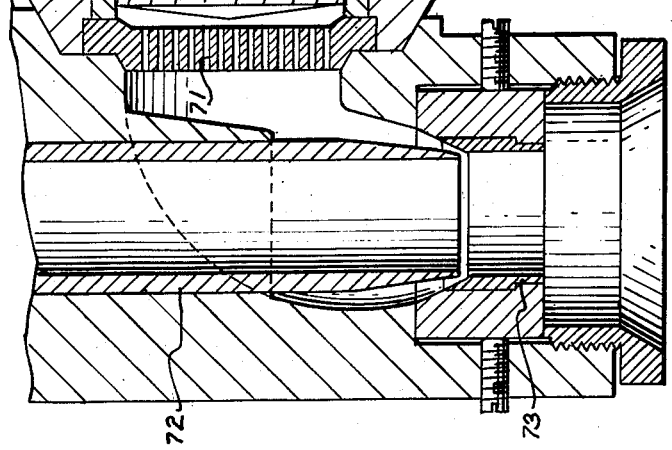
INVENTOR
H. A. MYERS
BY *E. H. Kane*
ATTORNEY

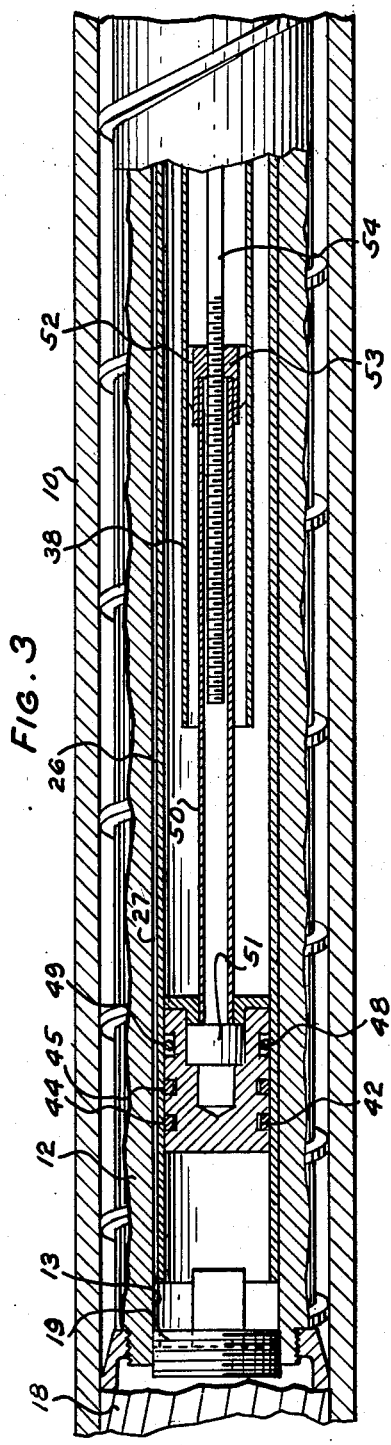

Patented June 16, 1953

2,641,800

UNITED STATES PATENT OFFICE 2,641,800

APPARATUS FOR ADVANCING AND WORKING PLASTIC COMPOUNDS

Hubert A. Myers, North Riverside, Ill., assignor to Western Electric Company, Incorporated, New York, N. Y., a corporation of New York Application June 21, 1951, Serial No. 232,801

11 Claims. (Cl. 18—12)

This invention relates to apparatus for advancing and working plastic compounds, and more particularly to cooling systems for extrusion apparatus.

Plastic compounds are often used to insulate and jacket conductors and cable cores. It has been proposed in the past to introduce these compounds into an extruder in a relatively unworked condition and to work the compounds sufficiently while in the extruder to bring the compounds to a highly extrudable condition. It is essential that such compounds be subjected to considerable work to compact the compound, to expel air trapped in the compound and to make the extruded compound homogenous. Along some portions of the extruder it is essential to keep the stock screw cool to promote delivering and mixing action thereof while just before the compound is extruded it is essential that the compound be quite hot before it is extruded. Various cooling systems have been suggested in the past. However, none of these have had sufficient flexibility to adapt a single extruder to the wide variety of cooling conditions necessary for extruding many different types of compounds or variations in one type of compound.

An object of the invention is to provide new and improved apparatus for extruding plastic compounds.

A further object of the invention is to provide new and improved cooling systems for extruders.

Another object of the invention is to provide a cooling system for cooling a portion of an extruder stock screw for advancing and mixing plastic compounds in which the portion of the stock screw being cooled may be adjusted without interrupting the operation of the extruder.

An apparatus illustrating certain features of the invention may include an extruding cylinder and a hollow stock screw. A piston is mounted in the hollow stock screw and means are provided for moving the piston to different positions along the stock screw so that the effect of a heat transfer fluid introduced into the hollow stock screw may be varied.

A complete understanding of the invention may be obtained from the following detailed description of an apparatus forming a specific embodiment thereof, when read in conjunction with the appended drawings, in which:

Fig. 1 is a side elevation of an apparatus forming a specific embodiment of the invention;

Fig. 2 is an enlarged, fragmentary, horizontal section taken along line 2—2 of Fig. 1;

Fig. 3 is an enlarged, horizontal section taken along line 3—3 of Fig. 1;

Fig. 4 is an enlarged, horizontal section taken along line 4—4 of Fig. 1;

Fig. 5 is an enlarged, horizontal section of a portion of the apparatus shown in Fig. 3, and Fig. 6 is an enlarged, vertical section taken along line 6—6 of Fig. 5.

Referring now in detail to the drawings, there is shown therein an apparatus for extruding organic plastic compounds, such as, for example, a compound including as the essential ingredient thereof rubber, neoprene (polymerized chloroprene), copolymer of butadiene and styrene or a thermoplastic material, such as polyethylene, polyvinyl chloride, a copolymer of vinyl chloride and vinyl acetate, or the like, and for controlling the temperature of the materials in accordance with the position of the material along an extruding cylinder 10 having a bore 11 therein. A stock screw 12 having a bore 13 formed therein is rotatably mounted in the cylinder 10, and a stock screw extension 18 is secured to the delivery end of the stock screw 12. A plug 19 (Fig. 3) closes the lefthand end of the bore 13, as viewed in Fig. 3.

A drive gear 20 (Fig. 4) meshes with a gear 21 keyed to the stock screw 12, and drives the stock screw. The gear 21 is mounted rotatably by fixed bearings 22 and 23, the bearing 23 having a vent hole 24 therein. A tube 26 mounted in the bore 13 in the stock screw 12 has vent grooves 27 extending from the lefthand end of the tube 26, as viewed in Fig. 3, to the righthand end of the screw 12, as viewed in Fig. 4. The tube 26 is rotatable with the stock screw 12, and the righthand end of the tube projects through a housing 32, and a sealing bearing 30 mounts a fitting 31 rotatably on the tube. A drain passage 34 formed in a fitting 35 secured to the fitting 31 communicates with the interior of the tube 26.

A supply tube 38 threaded into a passage 39 formed in the fitting 35 extends along the tube 26 and the stock screw 12 a substantial portion of the length thereof, and a piston 41 (Fig. 3) mounted slidably in the tube 26 has grooves 42 and 43 in which expansible steel rings 44 and 45 are mounted. The piston 41 is also provided with a groove 48 in which a ring 49 composed of rubber, neoprene (polymerized chloroprene), or the like, is mounted so that the piston seals the portion of the tube 26 at one end thereof from the portion of the tube 26 at the other end of the piston. A pull sleeve 50 connected to the piston 41 by a radial and thrust bearing 51 is slidably mounted in the tube 38, and is held against rotation relative to the tube 38 by a spider 52 (Figs. 3 and 6). A nut 53 fastened rigidly to the spider 52 threadedly engages an elongated threaded rod 54 extending into the tube 38 through a bore 60 formed in the fitting 35 (Fig. 4). The rod 54 may be turned by a crank 61 pinned thereto. A packing nut 62 seals the end of the bore, and the crank and a gear 55 of a position-indicator 56 keep the rod 54 from moving longitudinally relative to the gear housing 32. The indicator 56 provides a visual indication of the position of the piston relative to the screw. A supply pipe 63 for supplying heat exchange fluid to the hollow stock screw is threaded into a tapped bore 64 formed in the fitting 35 and communicating with the tube 38. The portion of the tube 38 beyond the righthand end portion thereof is square in cross-section so that the spider 52 (Figs. 3 and 6) may be slid along the tube 38 and cannot be turned relative to the tube.

The extruder includes a hopper 70 (Fig. 1), through which the plastic compound is introduced to the extruder, and also includes a breaker plate 71, a core tube 72 and a die 73 for forming a covering over a cable core advanced downwardly, as viewed in Fig. 2, through the core tube 72 and the die 73.

Operation

The plastic compound is introduced into the extruding cylinder 10 through the hopper 70, and the stock screw 12 and the stock screw extension 18 are rotated continuously in the bore 11 in the extruding cylinder to advance the compound along the cylinder, and to work the compound as it is advanced to make the compound extrudable. Cold water is introduced into the tube 38 from the supply pipe 63, flows along the tube 38 to the lefthand end thereof, as viewed in Fig. 3, until it reaches the piston, then reverses its direction of flow and flows along the outside of the tube 38 in the tube 26 back out through the passage 34 to cool the portion of the stock screw to the right of the piston 41. Then as the material is advanced past the cooled portion of the stock screw, the stock screw and the stock screw extension 18 work the compound severely to bring it up to an extrudable temperature.

Whenever it is necessary to change the length of the portion of the screw 12 which is to be cooled, the crank 61 is rotated to turn the threaded rod 54, which slides the spider 52, the sleeve 50 and the piston 41 along the tube 26 to any desired position. The piston 41 is free to rotate with the tube 26 and the stock screw 12 during extruding operation, and any moisture which might escape past the piston 41 into the portion of the tube 26 to the left of the piston 41 is formed into steam by the hot portion of the stock screw 12, and escapes through the groove 27 and the vent hole 24 into the atmosphere.

The above-described apparatus is highly flexible in its operation and serves to give good control of cooling and heating of the stock screw. The cooling tube 26, the tube 38 and associated elements may be used with a hot liquid to heat the stock screw if desired. Furthermore, the heat exchange liquid may be introduced through the passage 34 and withdrawn through the pipe 63 if desired.

Certain features of the above-described apparatus are disclosed and claimed in co-pending application Serial No. 232,825, filed June 21, 1951, by G. S. Brown for "Apparatus for Advancing and Working Plastic Compounds."

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. An apparatus for advancing and working plastic compounds, which comprises an extruding cylinder having a bore therein, a stock screw having a bore therein extending from one end thereof, a piston slidable in the bore in the stock screw, means secured to the piston and extending to a point beyond the stock screw for shifting the piston along the bore in the screw, and means for supplying a heat exchange fluid to the portion of the bore in the stock screw on one side of the piston.

2. An apparatus for advancing and working plastic compounds, which comprises an extruding cylinder having a bore therein, a stock screw having an entrance end and a delivery end and also being provided with a bore therein extending from one end thereof, a tube fitting into the bore in the stock screw, a piston slidable in the tube, means extending from the piston through one end of the tube for sliding the piston along the tube, means for sealing the last-mentioned end of the tube, and means for supplying a heat exchange fluid to the tube through the last-mentioned end thereof.

3. An apparatus for advancing and working plastic compounds, which comprises an extruding cylinder having a bore therein, a stock screw having a shank end and also being provided with a bore therein extending from the shank end thereof, a piston slidable in the bore in the stock screw for closing that bore, thrust-transmitting means accessible at the shank end of the screw for shifting the piston along the bore in the screw, and means for supplying a heat exchange fluid to the portion of the bore in the stock screw on one side of the bore-closing means.

4. An extruder, which comprises an extruding cylinder having a bore therein, a gear housing mounted at one end of the bore, a stock screw having a shank end fitting into the gear housing mounted rotatably in the bore, said stock screw having a bore extending from the shank end thereof to the delivery end thereof, a liner tube fitting tightly into the bore in the stock screw and extending beyond the shank end thereof through the housing, a second tube extending along the interior of the first tube, a supply pipe, a withdrawal pipe, fitting means connecting the housing end of the first tube to the withdrawal pipe and the housing end of the second tube to the supply pipe, a piston mounted slidably in the first tube, and means for extending from the piston through the second tube for sliding the piston along the first tube.

5. An extruder, which comprises an extruding cylinder having a bore therein, a gear housing mounted at one end of the bore, a stock screw having a shank end fitting into the gear housing mounted rotatably in the bore, said stock screw having a bore extending from the shank end thereof toward the delivery end thereof, a tube extending loosely along the interior of the bore in the stock screw, a supply pipe, a withdrawal pipe, fitting means connecting the housing end of the bore in the stock screw to the withdrawal pipe and the housing end of the tube to the supply pipe, a piston mounted slidably in the bore in the stock screw, and means extending from the piston through the tube for sliding the piston along the bore in the stock screw.

6. An extruder, which comprises an extruding cylinder having a bore therein, a gear housing mounted at one end of the bore, a stock screw having a shank end fitting into the gear housing mounted rotatably in the bore, said stock screw having a bore extending from the shank end thereof toward the delivery end thereof, a liner tube fitting tightly into the bore in the stock screw and extending beyond the shank end thereof substantially through the housing, a supply tube extending along the interior of the first tube, a supply pipe, a withdrawal pipe, fitting means connected to the housing, a seal connecting the liner tube to the fitting means, said fitting means connecting the liner tube to the withdrawal pipe and the housing end of the supply tube to the supply pipe, a piston mounted slidably in the liner tube, a rod having a threaded end portion extending through the fitting and along the supply pipe, a spider slidable along the supply tube and threaded onto the rod, means including a thrust bearing connecting the piston to the spider, means holding the rod against longitudinal movement relative to the screw, and means for rotating the rod to move the piston along the screw.

7. An extruder, which comprises an extruding cylinder having a bore therein, a gear housing mounted at one end of the bore, a stock screw having a shank end fitting into the gear housing and mounted rotatably in the bore, said stock screw having a bore extending from the shank end thereof to the delivery end thereof, a supply tube extending along the interior of the bore and held against rotation, a supply pipe, a withdrawal pipe, fitting means connecting the shank end of the bore in the stock screw to the withdrawal pipe and the housing end of the tube to the supply pipe, a threaded rod extending through the fitting and along the supply tube, a nut having a flow passage therethrough threaded on the rod, means splining the nut to the tube, a piston mounted slidably in the bore in the stock screw, and thrust means connecting the piston to the nut.

8. An extruder, which comprises an extruding cylinder having a bore therein, a gear housing mounted at one end of the bore, a stock screw having a shank end fitting into the gear housing mounted rotatably in the bore, said stock screw having a bore extending from the shank end thereof to the delivery end thereof, a liner tube fitting tightly into the bore in the stock screw and extending beyond the shank end thereof substantially through the housing, a supply tube having a portion square in cross-section extending along the interior of the liner tube, a supply pipe, a withdrawal pipe, fitting means connecting the housing end of the first tube to the withdrawal pipe and the housing end of the second tube to the supply pipe, said fitting means serving to mount the supply tube in the liner tube, a piston mounted slidably in the liner tube, a spider having a tapped bore therethrough mounted slidably in the supply tube, a threaded rod extending through the supply tube and the fitting and screwed into the bore in the spider, means sealing the rod and the fitting, means holding the rod against longitudinal movement relative to the fitting, means for rotating the rod, and means operable by the rod-rotating means for indicating the position of the piston relative to the stock screw.

9. An extruder, which comprises an extruding cylinder having a bore therein, a gear housing mounted at one end of the bore, a stock screw having a shank end fitting into the gear housing and mounted rotatably in the bore, said stock screw having a bore extending from the shank end thereof toward the delivery end thereof, a tube extending along the interior of the bore in the stock screw, a supply pipe, a withdrawal pipe, fitting means connecting the housing end of the bore in the stock screw to the withdrawal pipe and the housing end of the tube to the supply pipe, a piston mounted slidably in the tube, means extending from the piston through the tube for sliding the piston along the tube, and means operable by the piston-sliding means for indicating the position of the piston relative to the stock screw.

10. An extruder, which comprises an extruding cylinder having a bore therethrough provided with an entrance end and a delivery end, a gear housing at the entrance end of the bore having openings in the walls thereof aligned with the bore, a stock screw having a shank end, a delivery end and a bore therein extending from the shank end of the stock screw toward the delivery end thereof, means sealing the shank end of the screw to one wall of the housing and permitting rotation of the screw relative to that wall, a tube extending along the bore from a point intermediate the ends of the bore to the entrance end of the bore, a piston mounted in the bore in a stock screw, a threaded rod extending through the tube, a spider splined to the tube and threaded on the rod, thrust means connecting the piston to the spider for moving the piston along the bore in the stock screw, and means for actuating the rod to move the piston along the bore in the stock screw.

11. An extruder, which comprises an extruding cylinder having a bore therethrough provided with an entrance end and a delivery end, a gear housing at the entrance end of the bore having openings in the walls thereof aligned with the bore, a stock screw having a shank end, a delivery end and a bore extending from the shank end of the stock screw to the delivery end thereof, a cylindrical liner sleeve fitting tightly into the bore in the screw and extending beyond the shank end of the screw to one of the openings in the gear housing, means sealing the liner sleeve to one wall of the housing and permitting rotation of the liner relative to the wall, said sleeve having longitudinal grooves extending along the exterior thereof, a tube extending along the liner from a point intermediate the ends of the liner to the delivery end of the liner, a piston mounted in the liner, a rod extending along the tube, thrust means connecting the rod to the piston for moving the piston along the liner, and means for actuating the rod to move the piston along the liner.

HUBERT A. MYERS.

References Cited in the file of this patent

UNITED STATES PATENTS

| Number | Name | Date |
|---|---|---|
| 2,135,325 | Burt et al. | Nov. 1, 1938 |

FOREIGN PATENTS

| Number | Country | Date |
|---|---|---|
| 380,178 | Great Britain | Sept. 15, 1932 |